(12) United States Patent
Bastide et al.

(10) Patent No.: US 11,589,194 B2
(45) Date of Patent: Feb. 21, 2023

(54) LOCATION-DRIVEN SOCIAL NETWORK BOOSTING

(71) Applicant: INTERNATIONAL BUSINESS MACHINES CORPORATION, Armonk, NY (US)

(72) Inventors: Paul R. Bastide, Ashland, MA (US); Sathyanarayanan Srinivasan, Austin, TX (US); Fang Lu, Billerica, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 17/101,046

(22) Filed: Nov. 23, 2020

(65) Prior Publication Data

US 2022/0167128 A1   May 26, 2022

(51) Int. Cl.
| | | |
|---|---|---|
| *H04W 4/21* | (2018.01) | |
| *H04W 4/021* | (2018.01) | |
| *G06F 16/9536* | (2019.01) | |
| *G06F 16/9537* | (2019.01) | |
| *H04W 4/029* | (2018.01) | |
| *G06F 40/30* | (2020.01) | |

(52) U.S. Cl.
CPC .......... *H04W 4/21* (2018.02); *G06F 16/9536* (2019.01); *G06F 16/9537* (2019.01); *H04W 4/021* (2013.01); *H04W 4/029* (2018.02); *G06F 40/30* (2020.01)

(58) Field of Classification Search
CPC ....... H04W 4/21; H04W 4/021; H04W 4/029; G06F 16/9536; G06F 16/9537; G06F 40/30
See application file for complete search history.

(56) References Cited

U.S. PATENT DOCUMENTS

| | | | |
|---|---|---|---|
| 8,843,528 B1 | 9/2014 | Behforooz | |
| 10,366,436 B1* | 7/2019 | Kumar | ................. G06Q 10/087 |
| 10,482,145 B2 | 11/2019 | Arrowood | |
| 2009/0100037 A1* | 4/2009 | Scheibe | ............. G06F 16/9537 |
| | | | 707/999.005 |
| 2010/0211425 A1* | 8/2010 | Govindarajan | ...... G06Q 10/109 |
| | | | 701/465 |
| 2015/0088989 A1 | 3/2015 | Kaminsky | |

(Continued)

OTHER PUBLICATIONS

Disclosed Anonymously, "Dunbar's number," Wikipedia, Apr. 16, 2020, pp. 1-7.

(Continued)

*Primary Examiner* — Charles N Appiah
*Assistant Examiner* — Frank E Donado
(74) *Attorney, Agent, or Firm* — Brandon Lorenz Stephens; Kristofer Leon Haggerty (57) ABSTRACT

A method, a structure, and a computer system for location-driven social network boosting. The exemplary embodiments may include generating a network graph corresponding to a user of a social network and identifying a destined location of the user that differs from a current location of the user. The exemplary embodiments may further include identifying one or more gaps in the social network of the user at the destined location and augmenting the social network to fill the one or more gaps at the destined location.

20 Claims, 5 Drawing Sheets

(56) References Cited

U.S. PATENT DOCUMENTS

| | | | |
|---|---|---|---|
| 2016/0335271 A1 | 11/2016 | Gertzfield | |
| 2016/0378776 A1 | 12/2016 | Green | |
| 2018/0300819 A1 | 10/2018 | White | |
| 2019/0260705 A1* | 8/2019 | Gurievsky | H04L 51/04 |
| 2019/0342402 A1* | 11/2019 | Sharp | G06Q 50/01 |
| 2020/0012639 A1* | 1/2020 | Liu | G06F 16/3331 |
| 2020/0259912 A1* | 8/2020 | Williams | G06Q 50/01 |
| 2021/0217106 A1* | 7/2021 | Hauser | G06Q 30/0241 |
| 2021/0241163 A1* | 8/2021 | Witztum | G06N 20/00 |

OTHER PUBLICATIONS

Disclosed Anonymously, "Facebook for Developers—Graph API Reference," Facebook.Com, Printed Jul. 7, 2020, pp. 1-3.

Disclosed Anonymously, "Facebook for Developers—Graph API Version—User," Facebook.Com, Printed Jul. 7, 2020, pp. 1-26.

Disclosed Anonymously, "Facebook for Developers—Page Feed," Facebook.com, Printed Jul. 7, 2020, pp. 1-19.

Disclosed Anonymously, "Facebook for Developers—Webhook," Facebook.com, Printed Jul. 7, 2020, pp. 1-6.

Disclosed Anonymously, "Gnip APIs," GNIP.Com, Printed Jul. 7, 2020, pp. 1-4.

Disclosed Anonymously, "IBM Watson Natural Language Classifier," Printed Jul. 7, 2020, pp. 1-12.

Disclosed Anonymously, "Lobbyfriend Downloadable App," Web. Archive.Org, Printed Jul. 9, 2020, pp. 1-2.

Disclosed Anonymously, "Lobbyfriend.Com," Bluehost.com, Printed Jul. 7, 2020, pp. 1-1.

Disclosed Anonymously, "Push Technology," Wikipedia, Printed Jul. 7, 2020, pp. 1-7.

Disclosed Anonymously, "Webhooks for Pages," Facebook.Com, Printed Jul. 9, 2020, pp. 1-5.

Dunphy, "New app, LobbyFriend, connects hotels guests for a drink, a local outing, or to get their romance on," USA Today, Feb. 9, 2015, pp. 1-2.

Killworth, et al., "Estimation of Seroprevalence, Rape, and Homelessness in the United States Using a Social Network Approach," SAGE Publications, Eval Rev 1998; vol. 22; No. 2, DOI 10.1177/0193841X9802200205, Apr. 1998, pp. 289-308.

McCarty, et al., "Comparing Two Methods for Estimating Network Size," Human Organization, vol. 60, No. 1, Spring, 2001, pp. 28-39.

McCormick, et al.,"How Many People Do You Know?: Efficiently Estimating Personal Network Size," Journal of the American Statistical Association, Mar. 2010, vol. 105, No. 489, Applications and Case Studies, Mar. 2010, pp. 59-70.

Mell et al., "The NIST Definition of Cloud Computing", National Institute of Standards and Technology, Special Publication 800-145, Sep. 2011, pp. 1-7.

Vanderborg, "What is LobbyFriend? Get to Know the Temporary Social Network," International Business Times, Mar. 13, 2012, pp. 1-6.

* cited by examiner

LOCATION-DRIVEN SOCIAL NETWORK BOOSTING

BACKGROUND

The exemplary embodiments relate generally to social networks, and more particularly to location-driven social network boosting for messaging systems.

Online social networks connect people and information in logical and organized ways to share and process information. Common mechanisms for sharing and processing information may include the channel, inbox, text messages, wall, activity stream, timeline, comment stream, and profile. These mechanisms enable one to rapidly share information, connect, gather, and discuss many topics.

SUMMARY

The exemplary embodiments disclose a method, a structure, and a computer system for location-driven network boosting. Exemplary embodiments may include generating a network graph corresponding to a user of a social network and identifying a destined location of the user that differs from a current location of the user. The exemplary embodiments may further include identifying one or more gaps in the social network of the user at the destined location and augmenting the social network to fill the one or more gaps at the destined location.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Online social networks connect people and information in logical and organized ways to share and process information. Common mechanisms for sharing and processing information may include the channel, inbox, text messages, wall, activity stream, timeline, comment stream, and profile. These mechanisms enable one to rapidly share information, connect, gather, and discuss many topics.

These online social networks are formed through personal interactions and encounters, and therefore generally model a regional focus. While this regional focus of the social network may be helpful while within the region, it may reduce the effectiveness of a social network as a user travels outside the region. For instance, a user traveling for work or pleasure may find it difficult to use their social network for support at a destination. Currently, there are no solutions available to a social network user for automatically boosting a social network at a destined location, and in the current state of the art a user may have no means to establish a social network at a destined location for support such as restaurant, hotel, and rental car recommendations.

The present invention solves the aforementioned problems by detecting a social network user travelling, or intent thereto, and autonomously boosting their network at the destined location. Moreover, the present invention may further identify the particular support needed by the user at the destined location and boost their social network with respect thereto. A detailed description of the present invention follows.

Figure 1:
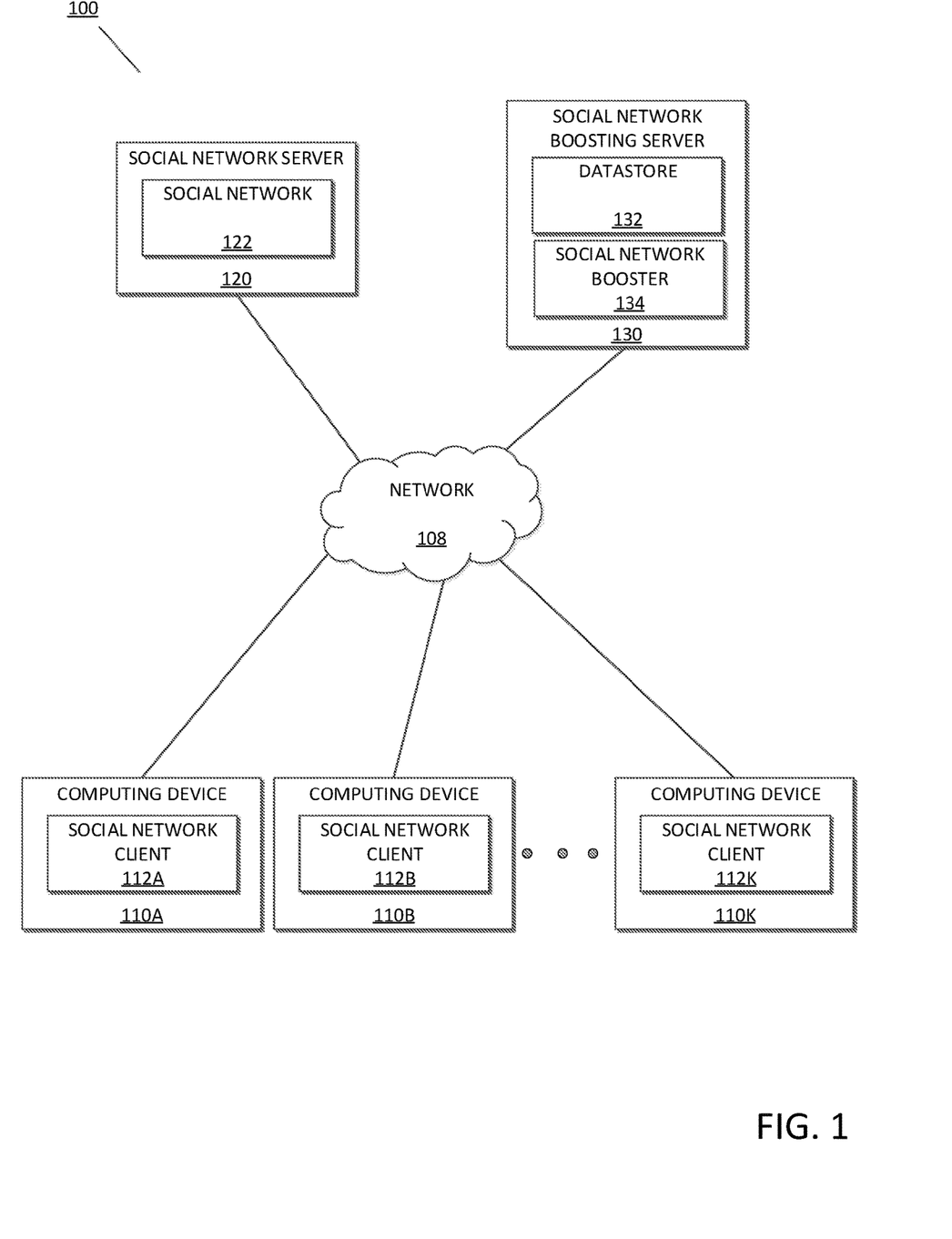
FIG. 1 depicts an exemplary schematic diagram of a social network boosting system 100, in accordance with the exemplary embodiments.

FIG. 1 depicts the social network boosting system 100, in accordance with exemplary embodiments. According to the exemplary embodiments, the social network boosting system 100 may include one or more computing devices 110A-K, a social network server 120, and a social network boosting server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. In the following detailed description, it is assumed that there may be any number of the one or more computing devices 110A-K, and each corresponds to a different user of the social network 122.

In the exemplary embodiments, the network 108 may be a communication channel capable of transferring data between connected devices. The network 108 may be the Internet, representing a worldwide collection of networks and gateways to support communications between devices connected to the Internet. Moreover, the network 108 may utilize various types of connections such as wired, wireless, fibre optic, etc. which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, each of the computing devices 110A-K may include a respective social network client 112A-K, and may each be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. The computing devices 110A-K are described in greater detail as a hardware implementation with reference to FIG. 3, as part of a cloud implementation with reference to FIG. 4, and/or as utilizing functional abstraction layers for processing with reference to FIG. 5.

The social network clients 112A-K may act as clients in a client-server relationship with a server, e.g., the social network server 120, and may be a software and/or hardware application capable of communicating with and providing a user interface for a user to interact with a server and other computing devices via the network 108. Moreover, in the example embodiment, the social network clients 112A-K may be capable of transferring data between the computing devices 110A-K via the network 108. In embodiments, the social network clients 112A-K may utilize various wired and wireless connection protocols for data transmission and exchange, including Bluetooth, 2.4 GHz and 5 GHz internet, near-field communication, Z-Wave, Zigbee, etc. The social network clients 112A-K are described in greater detail with respect to FIG. 2-5.

In exemplary embodiments, the social network server 120 includes a social network 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the social network server 120 is shown as a single device, in other embodiments, the social network server 120 may be comprised of a cluster or plurality of computing devices, in a modular manner, etc., working together or working independently. The social network server 120 is described in greater detail as a hardware implementation with reference to FIG. 3, as part of a cloud implementation with reference to FIG. 4, and/or as utilizing functional abstraction layers for processing with reference to FIG. 5.

The social network 122 may be a network for connecting one or more users. In embodiments, the social network 122 may include various means for communicating and sharing information, including a channel, inbox, text messaging, wall, activity stream, timeline, profile, etc. The social network 122 may allow users to establish relationships with and networks of other users with whom the user associates, as well as seek answers to questions and local advice. The social network 122 is described in greater detail with respect to FIG. 2-5.

In exemplary embodiments, the social network boosting server 130 includes a datastore 132 and an social network booster 134, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the social network boosting server 130 is shown as a single device, in other embodiments, the social network boosting server 130 may be comprised of a cluster or plurality of computing devices, in a modular manner, etc., working together or working independently. The social network boosting server 130 is described in greater detail as a hardware implementation with reference to FIG. 3, as part of a cloud implementation with reference to FIG. 4, and/or as utilizing functional abstraction layers for processing with reference to FIG. 5.

The datastore 132 may be a database of files, folders, documents, etc., for storing information. In embodiments, the datastore 132 may be analytical/atomic, and may detail one or more messages between one or more users of the social network 122. The datastore 132 is described in greater detail with respect to FIG. 2-5.

The social network booster 134 may be a software and/or hardware program that may detect and archive one or more social media messages. In addition, the social network booster 134 may generate a network graph, as well as determine a destined location of a user and social network at the destined location. The social network booster 134 may further analyze the social network with respect to the destined location and identify gaps thereof. Lastly, the social network booster 134 may augment the social network to cover the identified gaps and boost messages at the destined location to the augmented social network. In exemplary embodiments, the social network booster 134 may be integrated with the social network 122.

Figure 2:
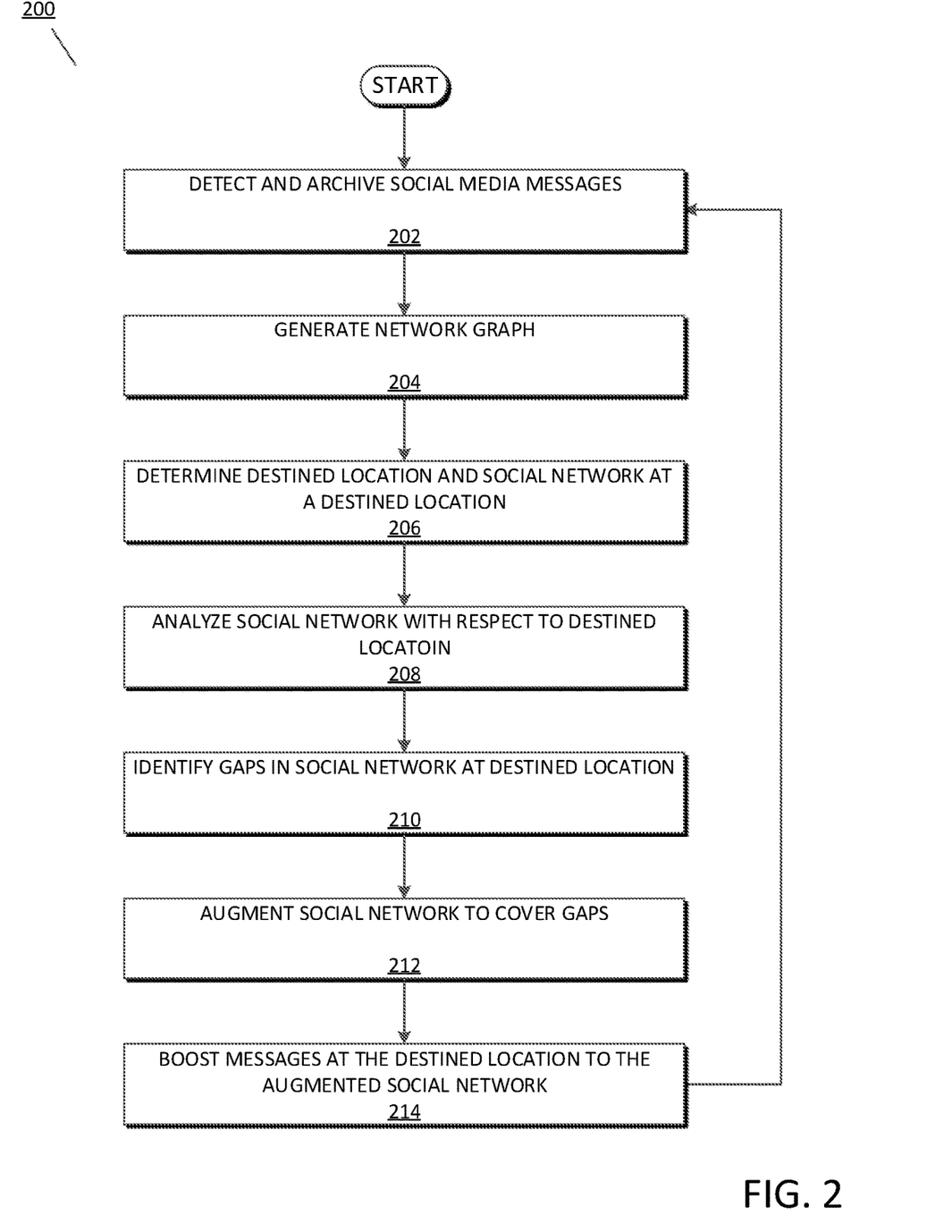
FIG. 2 depicts an exemplary flowchart 200 illustrating the operations of a social network booster 134 of the social network boosting system 100, in accordance with the exemplary embodiments.

FIG. 2 depicts an exemplary flowchart 200 illustrating the operations of the social network booster 134 of the social network boosting system 100, in accordance with the exemplary embodiments.

The social network booster 134 may detect and archive social network messages (step 202). As used herein, social network messages may be any communication between users of the social network 122, including direct messages, emails, posts, threads, etc., as well as replies thereto, which may be transmitted between users via the respective social network clients 120A-K and the network 108. In embodiments, the social network booster 134 may detect a message from a user via integration with the social network 122 and one or more techniques, which may be triggered by the social network booster 134, a user, an administrator, etc. In preferred embodiments, the social network booster 134 may detect messages using push message detection where the social network booster 134 receives a stream or batch of messages for a particular topic, user, or group of users instantly. Push message detection allows for stream-based processing of messages that ensures a logical ordering of the messages based on time, and further improves performance due to the scaling being performed at the backend data processing tier, unlike the proceeding two approaches. Alternatively, or in addition, the social network booster 134 may detect messages using pull feed detection which queries messages sent within a specific time frame or since a last query. For example, a pull feed implementation may retrieve messages for a particular user or for a particular topic every 15 minutes. In further embodiments, the social network booster 134 may detect messages via user interface detection where a command or interceptor captures data on the screen and scrapes the corresponding document object model for the elements of interest. Overall, the social network booster 134 may implement any method or combination of methods for detecting messages between users of the social network 122.

Upon detecting a message, the social network booster 134 may archive the message based on conversation-id and time within the datastore 132. In embodiments, the datastore 132 may be an analytical or atomic table, and the social network booster 134 may save information from each message in a first table using, e.g., the schema illustrated by Table 1:

TABLE 1

First Table Example Schema

| | |
|---|---|
| Message Details | {Body, Subject, Metadata} |
| Topic Concepts/Category | [0...* - Concept-1, Concept-2, Concept-3] |
| Unique Message Identifier | Generated or extracted from the message |
| Conversation Identifier | Generated through membership lists or extracted from the message |
| Access Control | Membership list of the conversation |
| Owner | Owner/Author of message, if Unknown marked as Unknown (e.g., user left company) |
| Location (GPS, Longitude/Latitude, Region) | Used to determine user proximity |
| Tenant | The assigned company or group, used for sharding the data and landing the data in a controlled data store |
| Terminal | Indicating that the message was the end of the conversation |
| Weights | Views, Participation metrics. May also consider reply-marks, read-marks, like/up-vote data, etc. to augment the extracted data |

In addition, the social network booster 134 may further extract and load into the datastore 132 a second table that is joined to the first table described above and includes information from the social network 122 for all users participating in the message. Such information may be represented in a primary table in, e.g., the schema illustrated by Table 2:

TABLE 2

Second Table Example Schema

| | |
|---|---|
| Person References | To, CC, BCC, and textual references to person identifiers |
| Message and Conversation Identifiers | To, CC, BCC, Conversation-ID, Thread ID |
| Body, Subject | Parsed into entities using entity recognition techniques |

Moreover, for user participating in the message, the social network booster 134 may extract profile information (e.g., interests, hobbies, expertise, profession, etc.), likes, dislikes, etc., using developer tools of the social network 122. The social network booster 134 may then load the extracted information into the second table and utilize the extracted profile information to provide context and means for entity disambiguation as needed when analysing messages between users of the social network 122. Importantly, the social network booster 134 may provide for opt-in/-out options for any or all of the information extracted from profiles of and messages between the users of the social network 122 via the social network client 112. Similarly, the social network booster 134 may additionally extend the schema to add a column labelling the data as private/public and implement corresponding access controls. The social network booster 134 may be configured to continually update its data processing engine specific to a user, group, team, organization, or company, and may delete unused data for privacy reasons or to conserve space, e.g., after a preconfigured time without use. Overall, the social network booster 134 may allow for maximum user flexibility when opting in/out of use of the social network booster 134, and may be enabled for specific periods of time, for specific users/teams/groups, and specific purposes of travel (e.g., business, pleasure, etc.).

In order to better illustrate the operations of the social network boosting system 100, reference is now made to an illustrative example wherein the social network booster 134 is configured for push message detection where messages between users of the computing devices 110A-K within the social network 122 are streamed to the social network booster 134 instantly. Here, the social network 122 of User A from Boston is illustrated by Table 3:

TABLE 3

Social Network of Frank

| User | Location | Concepts |
|---|---|---|
| User B | Boston | Hotel, Fudge, French Fries |
| User C | Boston | Tire, Rental, Repair |
| User D | Boston | Television |
| User E | San Diego | Repair |
| User F | San Diego | Television |
| User G | San Diego | Fudge, Hotel, Tire |

The social network booster 134 may generate a network graph of the archived social network information (step 204). More specifically, and based on the joined first and second data tables loaded into the datastore 132 above, the social network booster 134 may build an edge-vertex graph as illustrated by Table 4:

TABLE 4

Network Graph Mapping

| Type | Name | Details |
|---|---|---|
| Vertex | Message | Identifier - the edge is identified as a composite key - concatenation of Tenant Conversation Message identifiers. Links the Entities-to-Person based on authorship. The invention uses a vertex with secondary Edge without label. |
| Vertex | Entities, Tag, Concept | For each unique topic concept, there is one unique concept stored in the graph. |
| Vertex | Person | For each unique person in the access control or the owner, identified by GUID or Email. Non-Functional users are identified as a person, and the non-functional user may be pushed into a different vertex type - Non-Functional. |
| Vertex | Location | Location the user has been. |
| Edge | Relationship | The relationships include: Person-to-Person Message-to-Concept Person-to-Concept Person-to-Location Message-to-Location |

In embodiments, the social network booster 134 may further utilize the network graph in order to de-duplicate any redundant messages based on at least one of Time, Conversation-id, Message, Universally Unique Identifier (UUID), etc.

With reference again to the illustrative example above, the social network booster 134 generates a network graph representing the social network of User A based on the extracted information.

The social network booster 134 may determine a destined location and social network at the destined location (step 206). In embodiments, the destined location may be any location in which a user is currently present or intends to travel to, and determining the destined location may be performed by monitoring the social network 122. In particular, the social network booster 134 may determine a destined location based on at least one of user location data and/or intent to travel data. With respect to determining a destined location via location data, the social network booster 134 may detect a destined location based on global positioning system (GPS) data, check-ins to the social network 122, tags, landmarks, named entities, etc. Alternatively, or in addition, the social network booster 134 may determine a destined location based on detecting an intent to travel via analysis of social media communications. In particular, the social network booster 134 may search user messages, e.g., chats and posts, for locations and future-tense indications of an intent to travel. For instance, the social network booster 134 may identify an intent to travel based on identifying "San Diego" and the future tense "intend to go" within the sentence "I intend to go to San Diego," and labels the communication as a destined location. In addition, the social network booster 134 may determine an intent to travel based on analysing the locations of meetings and events scheduled for the user, querying receipts and purchases by the user, querying a travel agency database, etc. Overall, the social network booster 134 may use any techniques to determine an intent to travel of a user of the social network 122. In embodiments, the social network booster 134 may require multiple messages or a sufficiently complex conversation in order to identify an intent to travel from the natural language.

In embodiments, the destined location may be an anticipated area (determined similarly to the intent to travel, above), direct area (e.g., town, county, state, country boundaries, etc.), or a general area (e.g., within a proximity distance of a particular location, coordinates, etc.). Moreover, the social network booster 134 may be further configured to identify a purpose of travel, e.g., business, pleasure, governmental, etc., via techniques described above, e.g., natural language processing. By determining a purpose/category of travel, the social network booster 134 may be capable of implementing a finer grained natural language driven network and more accurately fill gaps within the social network 122.

In furthering the previously introduced example, the social network booster 134 may determine that User A intends to travel to San Diego based on natural language processing a post from User A that reads "Just booked my vacation to San Diego!"

The social network booster 134 may additionally identify a social network of the user at the destined location. The social network booster 134 may identify a social network of the user at the destined location based on similar techniques to those used above involving locational data or an intent to travel. In embodiments, the social network booster 134 may identify users within the social network 122 who are either in or have previously been in the destined location, recognizing that even visitors may be able to provide advice, and may additionally reference user profile information for current or past home locations in or within a threshold distance of the destined location. In embodiments, the social network booster 134 may be configured to periodically reassess the locations of users within the network 122 in order to keep the network graph up to date.

Returning to the illustrative example introduced above, the social network booster 134 determines that User E lives in San Diego based on a profile home location, User F is in San Diego based on check-in data, and User G has been to San Diego based on a previous post stating "Heading to San Diego for a conference."

The social network booster 134 may analyse the social network at the destined location (step 208). In embodiments, the social network booster 134 may analyse the destined location social network by comparing it to the current location social network of the user. Based on the comparison, the social network booster 134 may identify gaps in which the destined location social network may be boosted. The social network booster 134 may alternatively be configured to analyse the destined location social network relative to another location, such as a home location, work location, frequented location, user input location, etc. The social network booster 134 may first select a subgraph of the network graph detailing users and concepts of the current location social network of the user:

SELECT LOCATON, USER CONCEPTS
FROM GRAPH_NETWORK_CONCEPTS
WHERE LOCATION=% CURRENT_LOCATION %

In the earlier introduced example, the social network booster 134 may select a subgraph that details the following users and concepts within User A's social network within Boston:

Boston, User B, {Hotel, Fudge, French Fries}
Boston, User C, {Tire, Rental, Repair}
Boston, User D, {Television}

The social network booster 134 may then select a second subgraph of the network graph detailing users and concepts of the destined location social network of the user:

SELECT LOCATON, USER CONCEPTS
FROM GRAPH_NETWORK_CONCEPTS

WHERE LOCATION=% DESTINED_LOCATION %

With reference again to the earlier introduced example, the social network booster 134 may select a subgraph that details the following users and concepts within User A's social network in San Diego:

San Diego, User E, {Repair}
San Diego, User F, {Television}
San Diego, User G, {Fudge, Hotel, Tire}

The social network booster 134 may then identify gaps in the destined location social network by comparing the first and second subgraphs. In embodiments, the social network booster 134 may compare the subgraphs by joining the sets using a join function that preserves nulls, e.g., left outer join, such that the subgraphs are differenced:

LOCATION BOSTON, HOTEL, FUDGE, FRENCH FRIES, TIRE, RENTAL, REPAIR, TELEVISION

LOCATION SAN DIEGO, HOTEL, FUDGE, NULL, TIRE, NULL, REPAIR, TELEVISION

The social network booster 134 may use a count on the users and concepts using an aggregate to join the users:

BOSTON, NULL, TELEVISION, 2: [USER B, USER C]

The social network booster 134 may identify one or more gaps in the social network at the destined location (step 210). In embodiments, the concepts not covered at the destined location are identified based on the comparison between the current location social network and the destined location social network. More specifically, the social network booster 134 considered concepts included in the current location social network that aren't included in the destined location social network gaps in the destined location social network. Such a configuration may be advantageous for a user who intends to travel and wishes to have the same resources of their current location social network at the destined location. In embodiments, the social network booster 134 retrieves the users and concepts not covered at the destined location:

CONCEPT(TELEVISION) HAS PATH CONNECTED IN LOCATION B TO USER A

In some embodiments, the user may post a message to the social network 122 inquiring about goods or services at the destined location, e.g., a hotel or restaurant. In such embodiments, the social network booster 134 may be configured to further consider the inquiry when filling gaps in the social network 122 of the user by extracting a concept from the inquiry and identifying the concept as a gap that need be filled. The social network booster 134 may be configured to fill gaps based on the query alternatively or in addition to filling the gaps based on the comparison to the current location social network of the user.

Continuing the previously introduced example, the social network booster 134 identifies gaps in the social network 122 of User A that include French Fries and Rentals. In addition, and based on User A posting a message inquiring "Where is a good place to eat in downtown San Diego?," the social network booster 134 identifies Restaurants as a concept gap.

The social network booster 134 may augment the social network at the destined location to cover the gaps (step 212). In embodiments, the social network booster 134 may query the relationship graph generated above to identify a subset of users within (or previously within) the destined location and indirectly connected to the user. The social network booster 134 may consider a user an indirect connection based on a mutual user connection, and may consider degrees of separation based on how many mutual connections are needed to connect the users. For example, connected users may be considered directly connected, while users who aren't connected but have a mutual connection may be considered a indirectly connected with one degree of separation. If the connection requires a chain of two or more connections, the indirect connection may correspondingly be two or three degrees of separation, etc. Based on preferences of the user, the social network booster 134 may be configured to consider augmenting a network with only those users having up to a maximum degree of separation from the user, e.g., two or three degrees of separation. Similarly, the social network booster 134 may further implement a currency filter to identify fellow users that the user has not communicated with in a specified period of time, e.g., 1 month, 6 months, 1 years, etc., and additionally filter based thereon. As previously mentioned, the social network booster 134 may consider any users who have spent time in the destined location, and accordingly may additionally consider non-home locations as unique concept sets, and filter based on a past history of non-home locations.

If the social network booster 134 is unable to determine a social network at the destined location using the aforementioned filters, e.g., the user has a minimal or no network, the augmenting of the social network may expand to trusted resources, for example functional network friends such as airlines, embassies, trains, buses, etc. The social network booster 134 may further identify connections that include trusted local advisors, such as tourism offices, better business bureaus, etc. Lastly, the social network booster 134 may identify users having matching similar network characteristics as proxies to communicate with.

Furthering the previously introduced example, the social network booster 134 augments the determined social network to include User H, a friend of User D who lives in San Diego and knows about French Fries, and User I, a friend of User E who frequents San Diego for business and knows about Rentals, and User J, a friend of User F who lives in San Diego and knows about Restaurants.

The social network booster 134 may boost messages at the destined location to the augmented social network (step 214). In embodiments, the social network booster 134 may boost messages from the user by connecting mutual connections in various degrees of separation and making the messages more noticeable to users who may fill gaps within the social network 122 (e.g., a higher weight and view in the newsfeed, marking high priority, prompting a user to reply to the message, visual and audio cues, etc.). The social network booster 134 may, e.g., provide a template for users to connect in which a user merely selects to accept or decline the connection, and may provide context in the connection invitation, for example indicating that they share a mutual connection and/or concept interests. In addition, the social network booster 134 may be configured to forward the user inquiry to the augmented network. In general, the social network booster 134 may be configured to assist or facilitate connecting users in accordance with user preferences, as well as emphasize messages between users.

Concluding the aforementioned example, the social network booster 134 facilitates User A connecting to each of User H, User I, and User J within the social network 122. In addition, the social network booster 134 emphasizes the post from User A inquiring about Restaurants in San Diego to User J.

Figure 3:
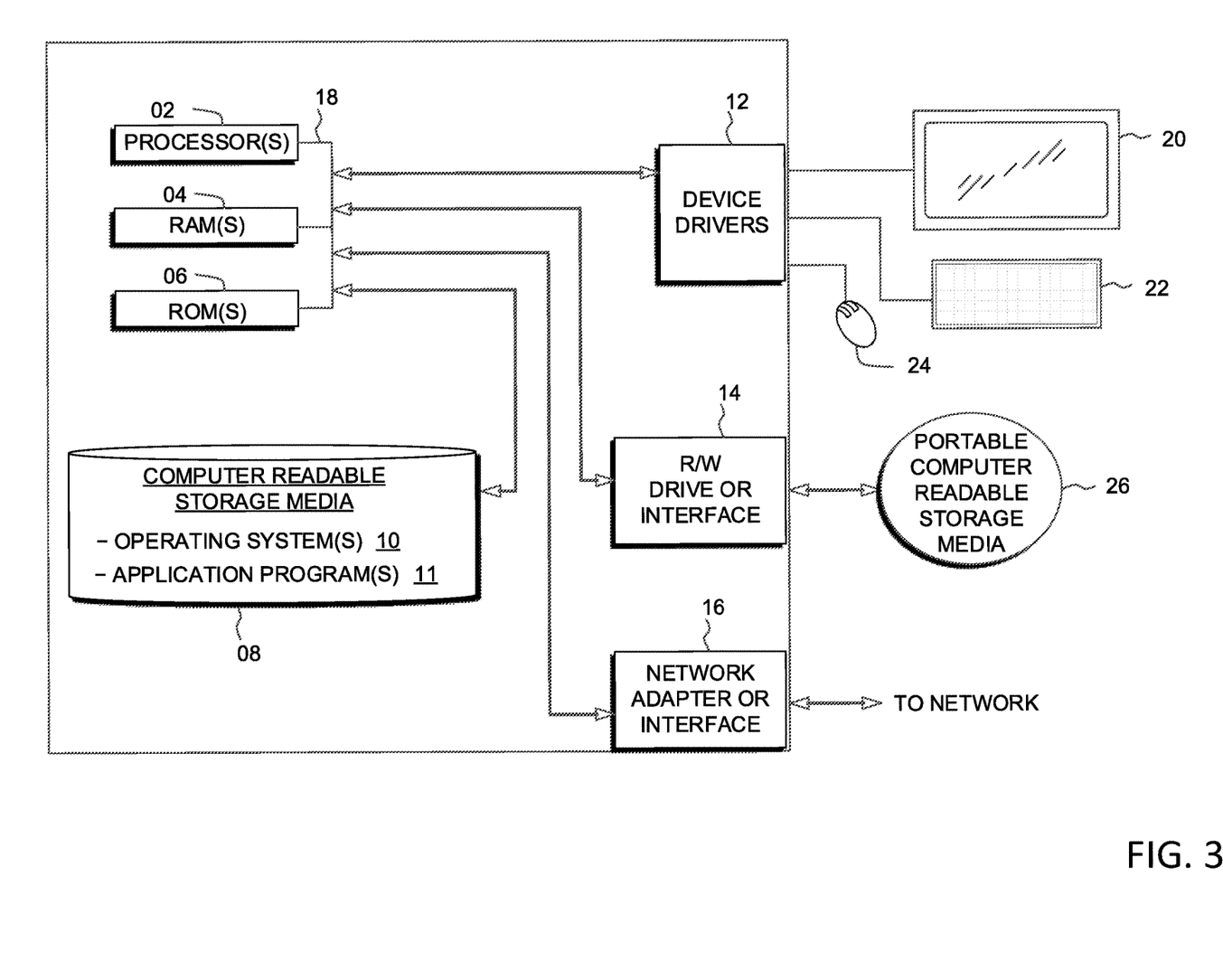
FIG. 3 depicts an exemplary block diagram depicting the hardware components of the social network boosting system 100 of FIG. 1, in accordance with the exemplary embodiments.

FIG. 3 depicts a block diagram of devices used within the social network boosting system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
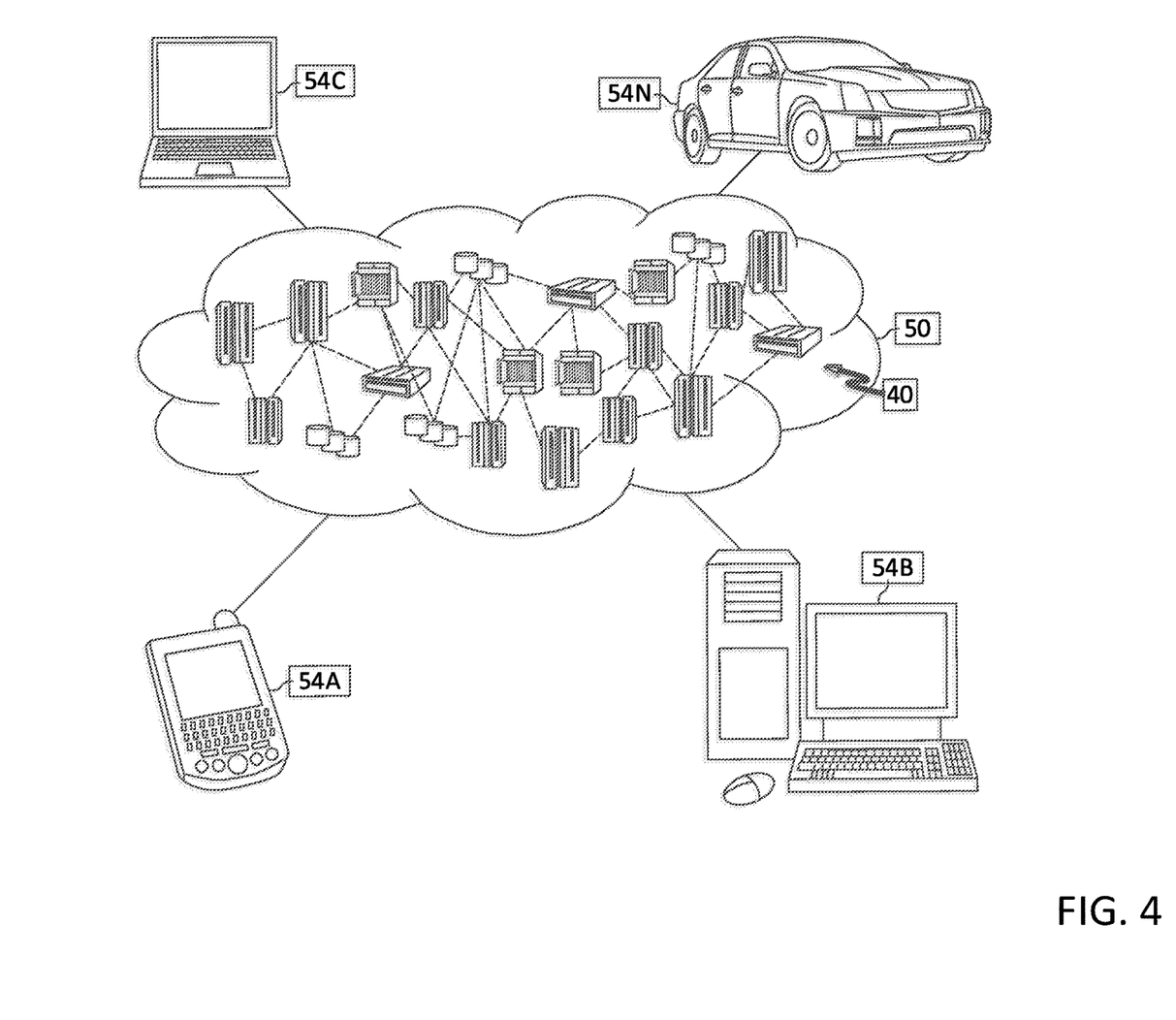
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
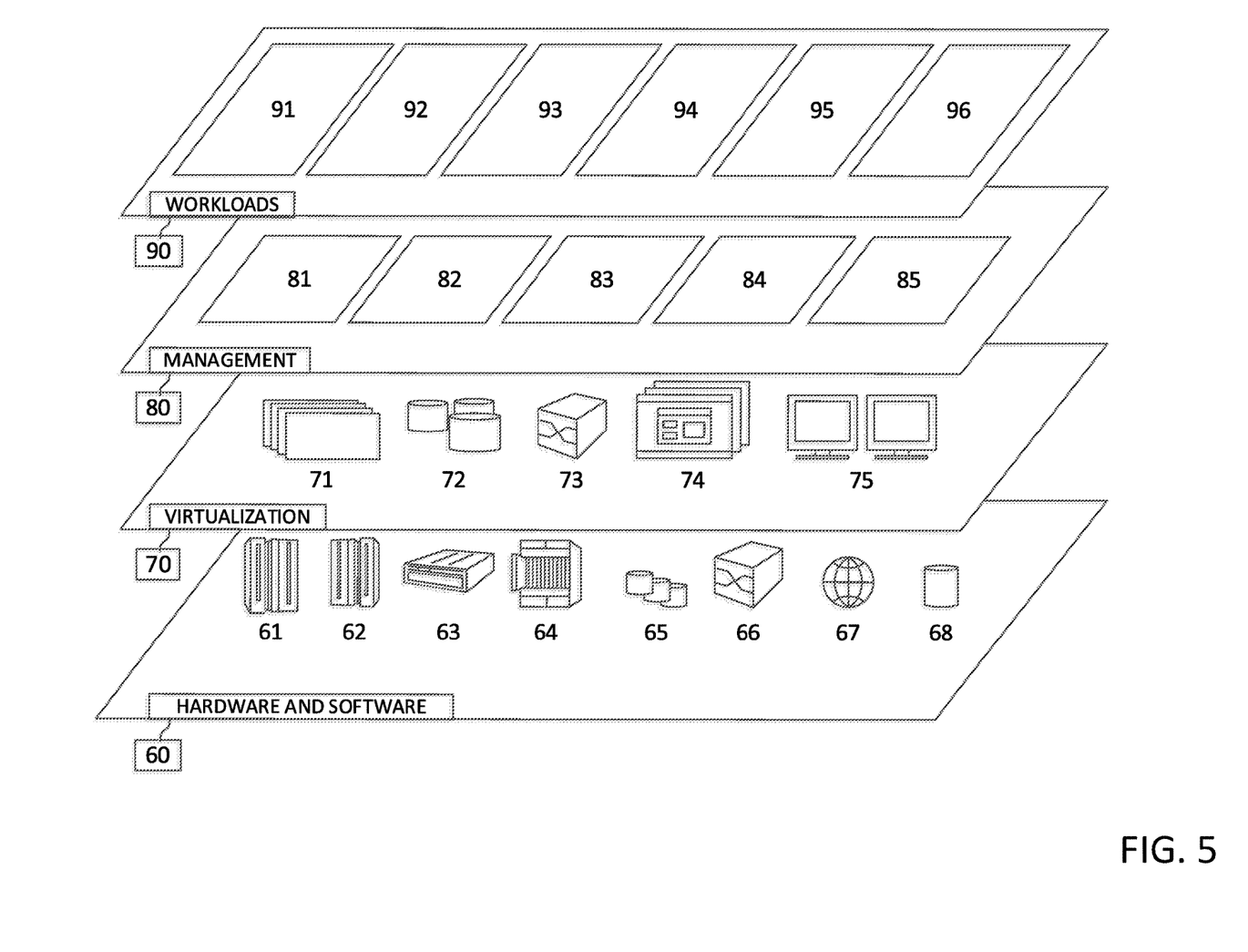
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and boosting processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for location-driven social network boosting, the method comprising:
   generating a network graph corresponding to a user of a social network, wherein the social network includes a personal social network of the user;
   identifying a destined location of the user that differs from a current location of the user;
   identifying one or more gaps in the personal social network of the user for the destined location based on an absence of at least one keyword used by the personal social network of the user for the destined location;
   augmenting the personal social network of the user with at least one indirect connection based on a mutual user connection and at least one degree of separation to fill the one or more gaps for the destined location by connecting the user with users up to a maximum degree of separation from the user that receive at least one message associated with the destined location; and
   boosting messages of the user for the augmented social network, wherein the boosted messages are related to the at least one absent keyword associated with the destined location of the user.

2. The method of claim 1, where identifying one or more gaps in the social network at the destined location further comprises:
   identifying one or more concepts and users detailed by a first subgraph of the network graph at the current location;
   identifying one or more concepts and users detailed by a second subgraph of the network graph at the destined location; and comparing the first subgraph to the second subgraph.

3. The method of claim 1, wherein augmenting the social network to fill the one or more gaps at the destined location further comprises:
   identifying one or more potential users at the destined location having both an indirect connection with the user through one or more mutual users and knowledge corresponding to the one or more gaps.

4. The method of claim 3, further comprising:
   prompting the one or more mutual users to introduce the user to the one or more potential users.

5. The method of claim 1, further comprising:
   receiving a query from the user relating to the destined location.

6. The method of claim 1, wherein identifying the destined location of the user is based on a query, and wherein identifying one or more gaps in the social network of the user is based on the query.

7. The method of claim 1, wherein identifying the destined location of the user further comprises at least one of receiving locational data from a device associated with the user or detecting an intent to travel to the destined location via natural language processing.

8. A computer program product for location-driven social network boosting, the computer program product comprising:
   one or more non-transitory computer-readable storage media and program instructions stored on the one or more non-transitory computer-readable storage media capable of performing a method, the method comprising:
      generating a network graph corresponding to a user of a social network, wherein the social network includes a personal social network of the user;
      identifying a destined location of the user that differs from a current location of the user;
      identifying one or more gaps in the personal social network of the user for the destined location based on an absence of at least one keyword used by the personal social network of the user for the destined location;
      augmenting the personal social network of the user with at least one indirect connection based on a mutual user connection and at least one degree of separation to fill the one or more gaps for the destined location by connecting the user with users up to a maximum degree of separation from the user that receive at least one message associated with the destined location; and
      boosting messages of the user for the augmented social network, wherein the boosted messages are related to the at least one absent keyword associated with the destined location of the user.

9. The computer program product of claim 8, where identifying one or more gaps in the social network at the destined location further comprises:
   identifying one or more concepts and users detailed by a first subgraph of the network graph at the current location;
   identifying one or more concepts and users detailed by a second subgraph of the network graph at the destined location; and
   comparing the first subgraph to the second subgraph.

10. The computer program product of claim 8, wherein augmenting the social network to fill the one or more gaps at the destined location further comprises:
   identifying one or more potential users at the destined location having both an indirect connection with the user through one or more mutual users and knowledge corresponding to the one or more gaps.

11. The computer program product of claim 10, further comprising:
   prompting the one or more mutual users to introduce the user to the one or more potential users.

12. The computer program product of claim 8, further comprising:
   receiving a query from the user relating to the destined location.

13. The computer program product of claim 8, wherein identifying the destined location of the user is based on a query, and wherein identifying one or more gaps in the social network of the user is based on the query.

14. The computer program product of claim 8, wherein identifying the destined location of the user further comprises at least one of receiving locational data from a device associated with the user or detecting an intent to travel to the destined location via natural language processing.

15. A computer system for location-driven social network boosting, the system comprising:
   one or more computer processors, one or more computer-readable storage media, and program instructions stored on the one or more of the computer-readable storage media for execution by at least one of the one or more processors capable of performing a method, the method comprising:
      generating a network graph corresponding to a user of a social network, wherein the social network includes a personal social network of the user;
      identifying a destined location of the user that differs from a current location of the user;
      identifying one or more gaps in the personal social network of the user for the destined location based on an absence of at least one keyword used by the personal social network of the user for the destined location; and
      augmenting the personal social network of the user with at least one indirect connection based on a mutual user connection and at least one degree of separation to fill the one or more gaps for the destined location by connecting the user with users up to a maximum degree of separation from the user that receive at least one message associated with the destined location; and
      boosting messages of the user for the augmented social network, wherein the boosted messages are related to the at least one absent keyword associated with the destined location of the user.

16. The computer system of claim 15, where identifying one or more gaps in the social network at the destined location further comprises:
   identifying one or more concepts and users detailed by a first subgraph of the network graph at the current location;
   identifying one or more concepts and users detailed by a second subgraph of the network graph at the destined location; and
   comparing the first subgraph to the second subgraph.

17. The computer system of claim 15, wherein augmenting the social network to fill the one or more gaps at the destined location further comprises:
   identifying one or more potential users at the destined location having both an indirect connection with the user through one or more mutual users and knowledge corresponding to the one or more gaps.

18. The computer system of claim 17, further comprising: prompting the one or more mutual users to introduce the user to the one or more potential users.

19. The computer system of claim 15, further comprising: receiving a query from the user relating to the destined location.

20. The computer system of claim 15, wherein identifying the destined location of the user is based on a query, and wherein identifying one or more gaps in the social network of the user is based on the query.

\* \* \* \* \*